United States Patent
Janakiraman et al.

(10) Patent No.: US 8,290,911 B1
(45) Date of Patent: Oct. 16, 2012

(54) SYSTEM AND METHOD FOR IMPLEMENTING DATA DEDUPLICATION-AWARE COPYING OF DATA

(75) Inventors: Viswesvaran Janakiraman, San Jose, CA (US); Bruce Robert Montague, Santa Cruz, CA (US)

(73) Assignee: Symantec Corporation, Mountain View, CA (US)

( * ) Notice: Subject to any disclaimer, the term of this patent is extended or adjusted under 35 U.S.C. 154(b) by 341 days.

(21) Appl. No.: 12/495,784

(22) Filed: Jun. 30, 2009

(51) Int. Cl.
*G06F 7/00* (2006.01)

(52) U.S. Cl. ........................................ 707/640; 707/664

(58) Field of Classification Search .................. 707/610, 707/664, 640, 654, 653, 673
See application file for complete search history.

(56) References Cited

U.S. PATENT DOCUMENTS

| | | | |
|---|---|---|---|
| 2007/0204011 A1* | 8/2007 | Shaver et al. ................. | 709/219 |
| 2008/0243958 A1* | 10/2008 | Prahlad et al. ................ | 707/204 |
| 2010/0211616 A1* | 8/2010 | Khandelwal et al. ......... | 707/812 |
| 2010/0281228 A1* | 11/2010 | Wade et al. ................... | 711/162 |

* cited by examiner

*Primary Examiner* — Amy Ng

(74) *Attorney, Agent, or Firm* — Campbell Stephenson LLP

(57) ABSTRACT

A system and method for implementing data deduplication-aware copying of data are provided. In response to a request to copy a source file between a source filesystem and a destination filesystem, file mapping information corresponding to the source file is retrieved. The file mapping information is stored in a source filesystem map. The source filesystem accesses a source logical volume. The source logical volume maps to a deduplication storage area. The destination filesystem accesses a destination logical volume. The destination logical volume maps to the deduplication storage area. The source file comprises data stored in the deduplication storage area. A destination file is allocated, based on the file mapping information, in the destination filesystem. The destination file is mapped to the data stored in the data deduplication storage area.

17 Claims, 7 Drawing Sheets

US 8,290,911 B1

SYSTEM AND METHOD FOR IMPLEMENTING DATA DEDUPLICATION-AWARE COPYING OF DATA

FIELD OF THE INVENTION

This invention relates to storage systems and, more particularly, to locating and copying data in a deduplication storage system.

BACKGROUND OF THE INVENTION

In many of today's organizations, widespread access to data has become commonplace. To provide widespread access, many organizations and individuals access information via a computer network. For example, a server, which is further coupled to a storage device or storage network, services data access requests from clients. Some computer networks are configured such that the physical storage locations of the storage device are further abstracted as logical volumes, to which the clients direct data access requests via the server. During the operation of the computer network, the server or clients can copy data between the logical volumes. In order to accomplish the copying of data between logical volumes, both physical and logical storage locations are first allocated to accept the copied data and then, the actual data is copied from the first logical volume to the second logical volume.

Since copying data between logical volumes and filesystems involves both allocating storage locations for storing the data and the actual transfer of data between the logical volumes and filesystems, executing the allocation and transfer operations is time and resource intensive.

SUMMARY OF THE INVENTION

Embodiments provide a system and method for implementing data deduplication-aware copying of data. In response to a request to copy a source file between a source filesystem and a destination filesystem, file mapping information corresponding to the source file is retrieved. The file mapping information is stored in a source filesystem map. The source filesystem accesses a source logical volume. The source logical volume maps to a deduplication storage area. The destination filesystem accesses a destination logical volume. The destination logical volume maps to the deduplication storage area. The source file comprises data stored in the deduplication storage area. A destination file is allocated, based on the file mapping information, in the destination filesystem. The destination file is mapped to the data stored in the data deduplication storage area.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

Introduction

Figure 1:
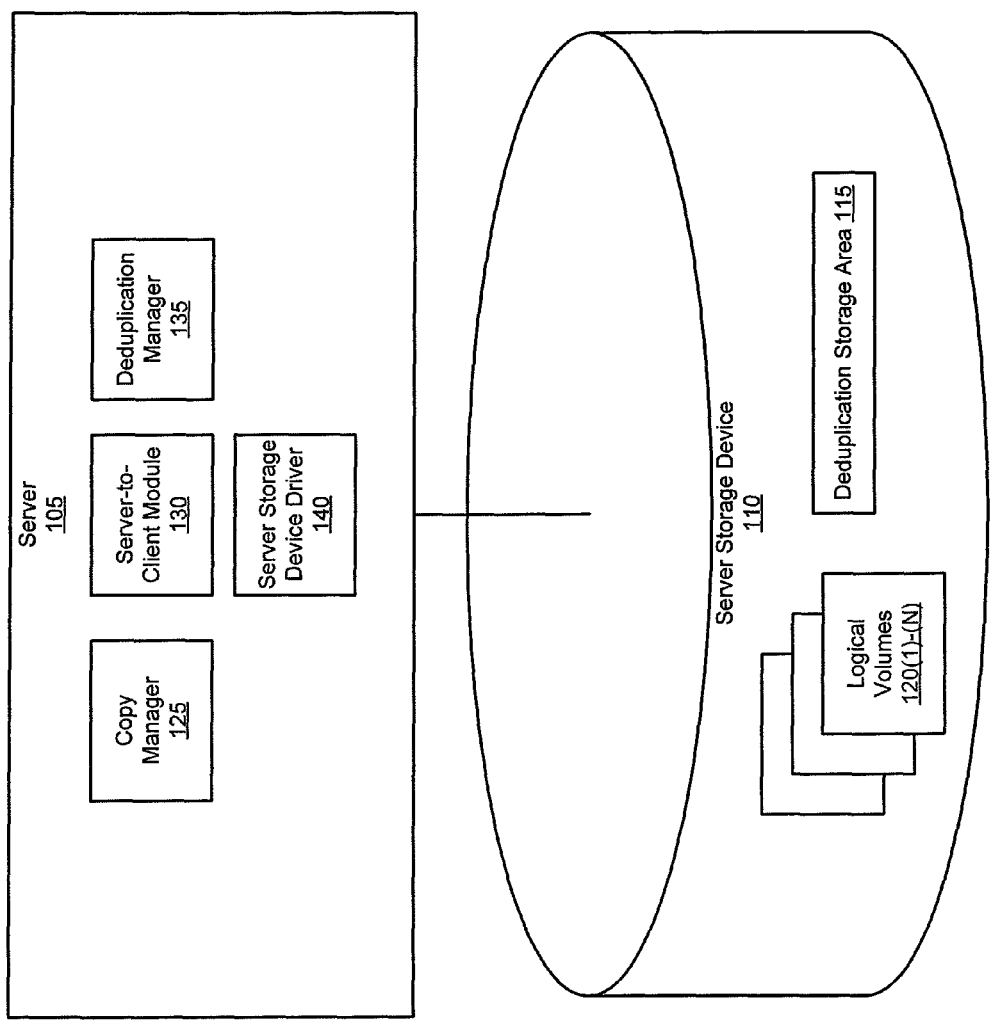
FIG. 1 is a block diagram illustrating a server that can be used to implement data deduplication-aware copying of data, according to an embodiment.

Embodiments of the present invention implement a data deduplication system that includes a deduplication storage area. The deduplication storage area stores blocks of data in physical block locations within a server storage device. Logical block locations of multiple logical volumes are mapped to the physical block locations of the deduplication storage area to form multiple views of the blocks of data in the deduplication storage area. Clients connect to a server coupled to the server storage device in order to read, write, or read and modify the blocks of data in the deduplication storage area via the logical volumes. The clients utilize filesystems to organize the logical block locations (which map to physical block locations within the deduplication storage area) into files and directories.

Ordinary copying of files between the multiple logical volumes can be resource-intensive. For example, using a non-data deduplication-aware copy technique, a source filesystem reads a source file and sends data (stored in the physical block locations in the deduplication storage area) over a network to a destination filesystem even though the source filesystem and the destination filesystem share the same deduplication storage area. The destination filesystem then creates a new (destination) file to receive the blocks of data and writes the blocks of data to the deduplication storage area. Eventually, during background processing, a deduplication manager of the data deduplication system determines that the blocks of data within the deduplication storage area mapped by the source and destination files are identical. The deduplication manager modifies physical block location metadata to release one set of identical blocks of data and maps the remaining blocks of data to both the source file and the destination file. This process involves an inefficient use of system resources (e.g., processor cycles, memory use, network bandwidth, and disk access time) and also results in unnecessary fluctuations in the available storage capacity of the deduplication storage area. For example, the available storage capacity decreases when a file copy process is performed because a copy of data mapped by one filesystem is transferred to and mapped by another filesystem.

A copy technique that is data deduplication-aware involves remapping physical block location metadata within the deduplication storage area without the actual transfer of data blocks between source and destination filesystems. In order to copy a source file from a source file system to a destination filesystem, a copy manager (which, as previously discussed, can also be implemented in a client) retrieves file mapping information from a source filesystem map associated with the source filesystem. The source filesystem map indicates the relationship between the files, as organized by the filesystem, and the logical block locations within the source logical volume. The source file mapping information indicates a first set of logical block locations within the source logical volume that make up the source file in the source filesystem. Using the file mapping information, the copy manager allocates a second set of logical block locations within the destination logical volume and also allocates a destination file within the destination filesystem. The destination file includes the allocated second set of logical block locations within the destination logical volume. The destination file, at this point, is an "empty container" (a file that is allocated without transferring any data into the storage locations allocated for the destination file).

The copy manager then passes the source and destination filesystem maps, as well as an indication of the correspondence between the first set of logical block locations within the source logical volume and the second set of logical block locations within the destination logical volume, to a deduplication manager. The deduplication manager accesses physical block location metadata corresponding to the physical block locations mapped by the first set of logical block locations within the source logical volume. The deduplication manager then modifies the physical block location metadata to include a mapping between the physical block locations and the second set logical block locations within the destination logical volume. In so doing, the copy manager, in conjunction with the deduplication manager, copies the source file in the source filesystem to the destination file in the destination filesystem by modifying physical block location metadata, without modifying or transmitting any blocks of data in the common deduplication storage area.

Data Deduplication and Storage Virtualization

One technique employed to minimize the storage of redundant copies of data is data deduplication. Data deduplication systems inventory data stored on the data deduplication system, identify duplicate copies of data, and discard the duplicate copies of data such that only one instance of a particular unit of data is stored in the data deduplication system.

Comparing actual units of data to identify duplicate copies is typically prohibitively costly, in terms of both time and computing resources. To address such issues, rather than comparing the actual units of data, smaller representations of the units of data (e.g., hash, checksum, and the like) are generated for each unit of data. To identify duplicate copies of data, these representations are compared, instead of comparing the actual units of data.

Data deduplication systems can be implemented as block-level deduplication systems, such that only one instance of a particular block of data is stored by the data deduplication system at one time. A block of data is a sequence of bytes or bits with a nominal length (e.g., a block size). As will be appreciated, a block can be of any size. A physical block location is a storage location used for storing a block of data. While some embodiments are discussed in terms of block-level deduplication systems, other embodiments (e.g., file-based deduplication systems) can be implemented as well.

According to one embodiment, a data deduplication system maintains a deduplication storage area within a computer-readable storage medium such as, for example, a disk drive, a flash drive, an optical drive, or the like. The deduplication storage area corresponds to a collection of physical block locations in the computer-readable storage medium. The collection of physical block locations is used to store blocks of data. The data deduplication system performs data deduplication on the deduplication storage area so that only one copy of a particular block of data is stored within the deduplication storage area.

Storage virtualization is a technique used to provide storage location independence between the physical block location where a particular block of data is stored and the block address used to access the block of data. By using storage virtualization, logical address spaces or logical volumes can be created. Such logical volumes can include logical block locations that map to physical block locations in a deduplication storage area of a data deduplication system.

Embodiments of the present invention facilitate the presentation of different views of data stored in a deduplication storage area. For example, the logical block locations of a first logical volume can map to physical block locations of the deduplication storage area representing the entire deduplication storage area while the logical block locations of a second logical volume map to a subset of the physical block locations in the deduplication storage area. Thus, the first logical volume (a complete view of the deduplication storage area) presents a different view of the deduplication storage area than the second logical volume (a partial view of the deduplication storage area).

In some embodiments of the present invention, a server is coupled to a server storage device, which includes a deduplication storage area. Using storage virtualization, logical volumes present different views of the deduplication storage area, as previously discussed. Clients access the logical volumes in the server storage device via the server. These clients implement a filesystem (within, for example, the clients' respective operating systems) that organizes blocks of data into files, where the blocks of the data are referenced by logical block locations within logical volumes. These files can be further organized into directories. Within this organization, the filesystem facilitates the storage, organization, manipulation, and retrieval of blocks of data, referenced by the logical block locations of the logical volumes, by the clients. A logical block location is referenced in terms of a logical block address. Likewise, a physical block location is referenced in terms of a physical block address.

An Example Architecture for Implementing Data Deduplication-Aware Copying of Data FIG. 1 is a simplified block diagram that illustrates a server capable of communicating with clients. For example, as described subsequently in conjunction with FIG. 6, a server can communicate with such clients via a direct connection or a connection via a network such as the Internet. It will be appreciated that a server is only an example of any number of computer systems that can be employed in such an architecture.

As illustrated, a server 105 is coupled to a server storage device 110, which is implemented as a deduplication storage device. As illustrated, server storage device 110 also includes deduplication storage area 115 and logical volumes 120(1)-(N). Logical volumes 120(1)-(N) are generated from deduplication storage area 115. For example, logical volumes 120(1)-(N) can be implemented as point-in-time copies of deduplication storage area 115. In some embodiments, logical volumes 120(1)-(N) are space-optimized snapshots such as copy-on-write snapshots. As an example, logical volumes 120(1)-(N) can be generated by copying state information (e.g., metadata associated with the data stored in the physical blocks of deduplication storage area 115 and referencing physical block locations of deduplication storage area 115). Thus, using logical volumes 120(1)-(N), server 105 presents multiple views of the data stored in deduplication storage area 115 to clients coupled to the server. According to another embodiment, logical volumes 120(1)-(N) can be implemented as logical volumes accessed by virtual machines running on server 105, which serves as a host computer. The virtual machines emulate computer hardware and can be used to execute, for example, multiple operating systems at the same time. Another embodiment implements clients coupled to server 105 as virtual machines. The virtual machines consume deduplication storage space (e.g., storage space in deduplication storage area 115) via server 105.

Deduplication storage area 115, implemented as a block-level deduplication storage area, stores data within the physical block locations that make up deduplication storage area 115. The physical block locations are used to provide multiple logical volumes that are based on the data blocks stored in the physical block locations. For example, if server 105 provides three separate views of deduplication storage area to three separate clients coupled to server 105, three logical volumes 120(1), 120(2), and 120(3) are created. The logical block locations in the logical volumes are mapped to physical block locations within deduplication storage area 115. For example, a physical block location n within deduplication storage area 115 is mapped by logical block location m of logical volume 120(1), logical block location/of logical volume 120(2), and logical block location p of logical volume 120(3), which are provided for access by client filesystems (discussed herein in more detail in conjunction with FIG. 2) of the three separate clients coupled to server 105.

Further included in server 105 are a copy manager 125, a server-to-client module 130, a deduplication manager 135, and a server storage device driver 140. Copy manager 125 enables data deduplication-aware copying of files between client filesystems. Server-to-client module 130 can be implemented as a network interface module or other device that enables the server to communicate with directly-connected clients or with clients coupled to the server via a network. Other embodiments implement server-to-client module 130 as a specialized communication module, designed to allow the server to communicate with clients using other protocols and/or communication hardware.

Server storage device driver 140 enables server 105 to communicate with server storage device 110. Server storage device driver 140 can be implemented as a computer module that allows higher-level computer programs to interact with computer hardware such as server storage device 110.

According to one embodiment, copy manager 125 monitors a network (e.g., network 615 of FIG. 6) for a request to copy a file from a source filesystem to a destination filesystem. Copy manager 125 also retrieves file mapping information from the source filesystem to determine the size of the file to be copied from the source filesystem to the destination filesystem (among other such attributes). Copy manager 125 also allocates logical block locations in the destination logical volume to support a destination file within the destination file system. According to one embodiment, in the case of the New Technology File System (NTFS), copy manager 125 can allocate the logical block locations and the destination file by using a SetFileValidData( ) function call, which enables the creation of a valid file without the need for actually writing to the file.

Deduplication manager 135 performs a variety of functions. As a background process, deduplication manager 135 performs a deduplication process on deduplication storage area 115. Thus, deduplication manager 135 inventories the data stored in deduplication storage area 115, identifies duplicate blocks of data, and discards the duplicate blocks of data such that only one instance of a particular block of data is stored in the deduplication storage area 115.

According to one embodiment, deduplication manager 135 generates smaller representations (e.g., hash, checksum, and the like) of the blocks of data. To compare the blocks of data for duplicate blocks, the representations of the blocks of data are compared instead of the blocks of data themselves.

Also, deduplication manager 135, in conjunction with copy manager 125, performs data deduplication-aware copying of data between filesystems where the data's representation in each of the filesystem's map to the same deduplication storage area. According to one embodiment, upon receipt of source and destination filesystem maps and an indication of correspondence between a first set of logical block locations in a source logical volume and a second set of logical block locations in a destination logical volume from copy manager 125, deduplication manager 135 modifies physical block location metadata associated with physical block locations of deduplication storage area 115, which results in the addition of a mapping of the second set of logical block locations in the destination logical volume to the physical block location metadata. Thus, deduplication manager 135 facilities copying of a file between a source and destination filesystems without transferring data over a network.

According to an embodiment, copy manager 125 and deduplication manager 135 can copy multiple regions of a file simultaneously through multithreading processes performed by copy manager 125 and deduplication manager 135. Thus, for example, a first copy manager process and a first deduplication manager process can copy a first half of a file while a second copy manager process and a second deduplication manager process can concurrently copy a second half of the file.

According to an embodiment, copy manager 125 can be implemented within a filesystem located on a client (e.g., client 205 of FIG. 2) instead of being located on server 105. Thus, copy manager 125, located on the client, can interface with deduplication manager 135, located on a server, via interactions between a client-to-server module (e.g., client-to-server module 220 of FIG. 2) and server-to-client module 130.

Figure 2:
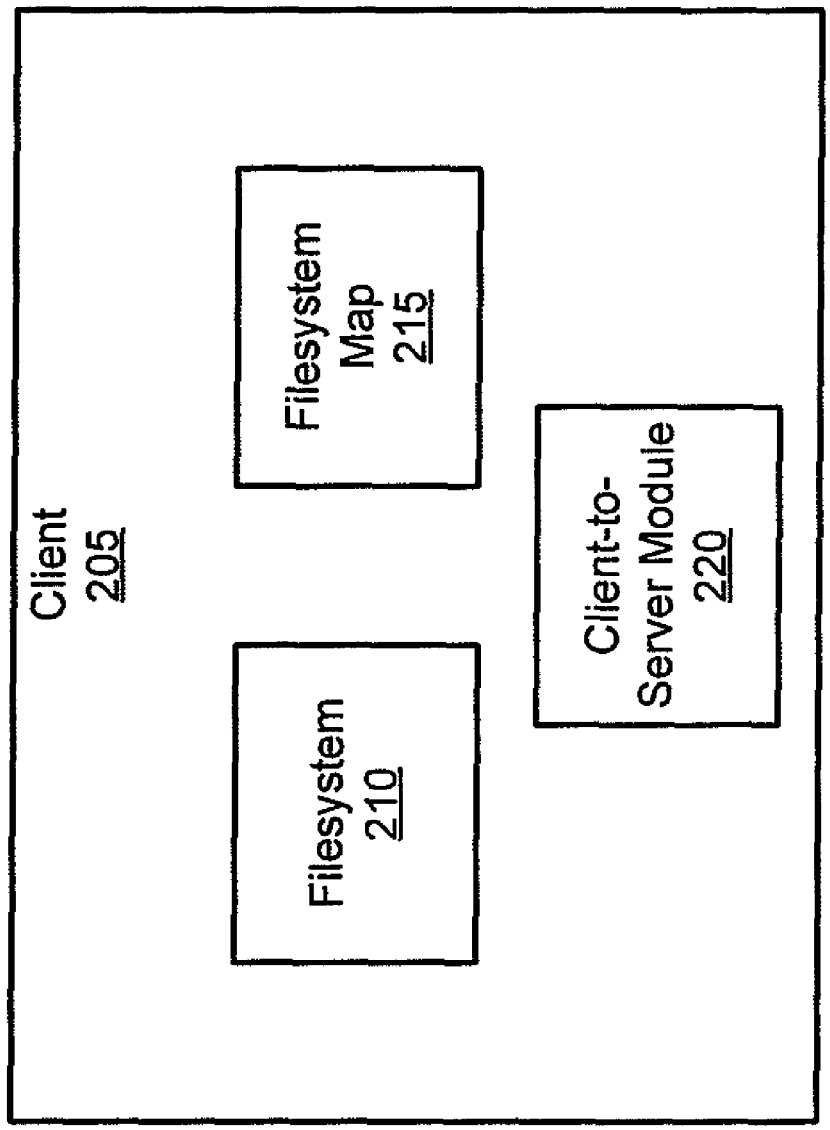
FIG. 2 is a block diagram of a client that can be used to implement data deduplication-aware copying of data, according to an embodiment.

FIG. 2 is a simplified block diagram of a client that can be used to communicate with a server (e.g., server 105 of FIG. 1). Those with skill in the art will appreciate that client 205 does not have to be a separate physical computer system, but can be implemented with server 105. As illustrated, client 205 includes filesystem 210, filesystem map 215, and client-to-server module 220.

According to one embodiment, filesystem 210 imposes a logical structure on logical block locations of a logical volume (e.g., logical volumes 120(1)-(N) of FIG. 1). For example, filesystem 210 organizes the data blocks mapped by the logical block locations into files and directories. Filesystem 210 also maps input/output (I/O) requests to logical block addresses of the logical block locations in the logical volume in terms of offset and length within files.

Filesystem map 215 is a data structure (e.g., an array, array of records, a database, or the like) that includes metadata describing the location of files and directories within the logical volume, as organized by filesystem 210. According to one embodiment of the present invention, filesystem map 215 can be implemented as a master file table (MFT) in NTFS. However, it will be appreciated that any filesystem can be employed in a system of the present invention, and such systems are in no way limited to NTFS. When a file or directory is created by filesystem 210, filesystem map 215 is updated with a record documenting the file or directory. The record is used to store information about the file or directory in the form of attributes. These attributes include, but are not limited to, the location of the file or directory, the size of the file or directory, and so on. According to one embodiment, filesystem map 215, the size of a file to be copied, and the like can also be retrieved via system application programming interface (API) calls. Also, client 205 includes a client-to-server module 220, which, enables client 205 to communicate with a server (e.g., server 105 of FIG. 1), and can be implemented as a network card.

Figure 3:
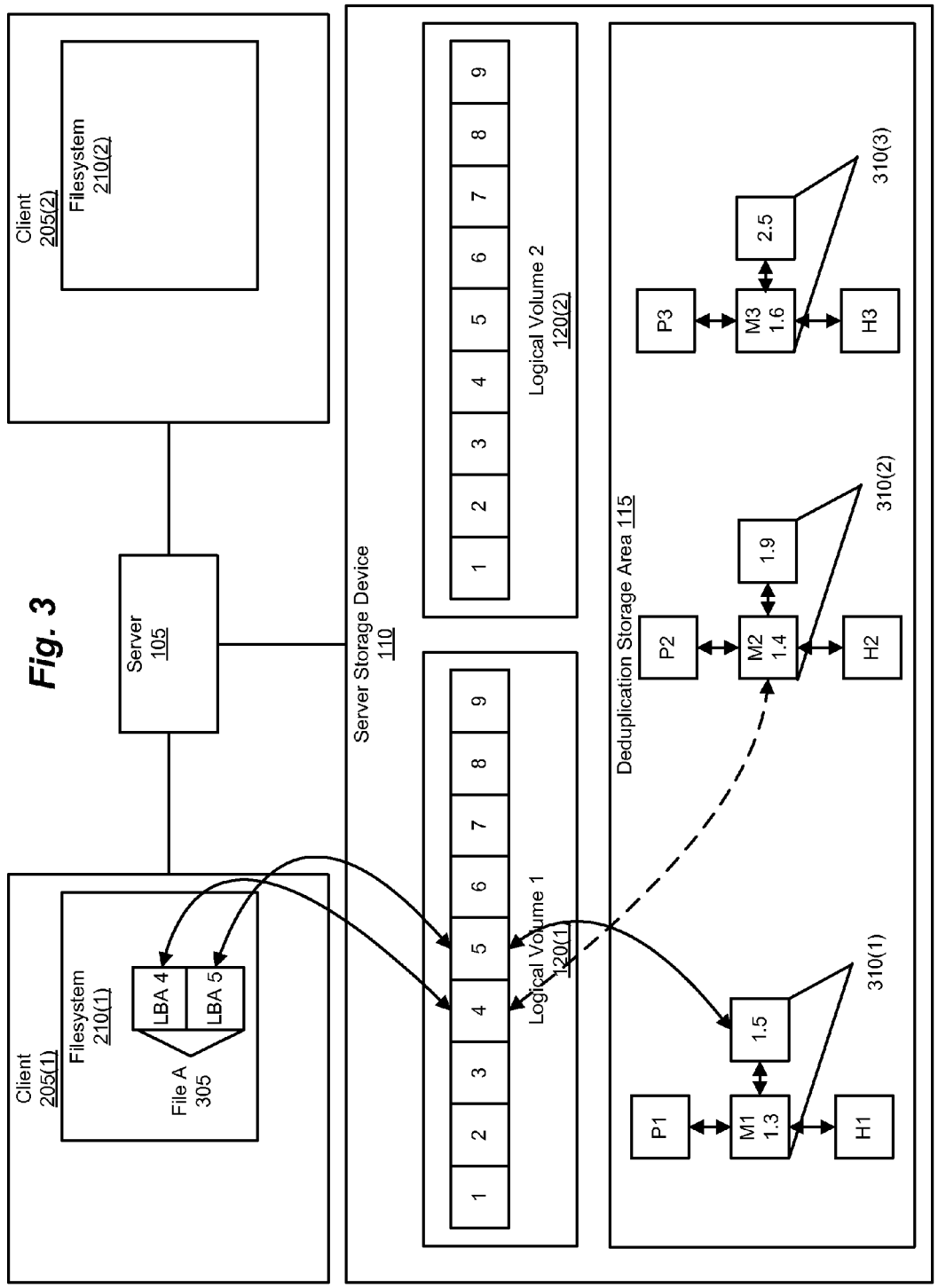
FIG. 3 is a block diagram illustrating an example of mapping relationships between physical block locations and logical block locations in a data deduplication system, according to an embodiment.

FIG. 3 is an example illustrating the mapping relationships between logical block locations within logical volumes, and physical block locations within a data deduplication system, before a data deduplication-aware copy of a file. As illustrated, deduplication storage area 115 (located in server storage device 110) includes a collection of physical block locations P1, P2, and P3. It will be appreciated that deduplication storage area 115 is not limited to three physical block locations, but can include any number of physical block locations. As previously described, deduplication storage area 115 is implemented such that only one copy of a particular block of data is stored in the physical block locations of deduplication storage area 115. Physical block addresses P1, P2, and P3 are used to reference physical block locations P1, P2, and P3, respectively. Associated with physical block locations P1, P2, and P3 are physical block location metadata M1, M2, and M3, respectively. The physical block location metadata includes data describing the physical block locations, such as, for example, data identifying a first logical block location within a first logical volume that maps to the physical block locations. For example, regarding physical block location metadata M1, the entry "1.3" indicates that the logical block location 3 of logical volume 1 (e.g., logical volume 1 120(1)) maps to physical block location P1 in deduplication storage area 115. As also illustrated, physical block location metadata M1, M2, and M3 also refer to hashes H1, H2, and H3, respectively. As previously discussed, hashes, or other representations of data, are used to identify duplicate copies of the blocks of data for deduplication processes.

Physical block location metadata M1, M2, and M3 are also implemented as a first entry in deduplication chains 310(1), 310(2), and 310(3). A deduplication chain is a linked list (or any other suitable data type or data structure) of translations that identifies all the logical block locations across the logical volumes in server storage device 110 that map to a particular physical block location. For example, traversing deduplication chain 310(1), starting at physical block location metadata M1 indicates that physical block location P1 is mapped by logical block location 3 of logical volume 1 120(1) (i.e., indicated by "1.3") and logical block location 5 of logical volume 1 120(1) (i.e., indicated by "1.5"). Deduplication chains 310(2) and 310(3) are constructed similarly, and also indicate logical block locations across other logical volumes that map to particular physical block locations. The deduplication chains facilitate data deduplication-aware copy of data by mapping the entries of the chain to a destination file allocated by a copy manager, as previously discussed.

In order to provide unique views of the data stored within the physical block locations of deduplication storage area 115, logical volumes 1 120(1) and logical volume 2 120(2) are created. Logical volume 1 120(1) and logical volume 2 120(2) include an array of logical block locations that map to the physical block locations of deduplication storage area 115. As shown in FIG. 3, logical volume 1 120(1) includes a first array of logical block locations 1-9 and logical volume 2 120(2) includes a second array of logical block locations 1-9. It will be appreciated that logical volume 1 120(1) and logical volume 2 120(2) are not limited to nine logical block locations, but can include any number of logical block locations. The logical block locations are referenced using logical block addresses.

As shown in FIG. 3, multiple logical block locations from multiple logical volumes can map back to a single physical block location. Thus, for example, logical block locations 3 and 5 of logical volume 1 120(1) map to physical block location P1. Deduplication chain 310(1) stores the mapping associations between the logical block locations and physical block location P1. By traversing deduplication chain 310(1), the logical block locations among the logical volumes that map back to physical block location P1 are determined.

Still referring to FIG. 3, clients 205(1)-(2) organize the array of logical block addresses of logical block locations within logical volume 1 120(1) and logical volume 2 120(2) using filesystems 210(1)-(2). Filesystems 210(1)-(2) organize the logical block locations into files and directories of files. As shown in FIG. 3, filesystem 210(1) includes File A 305. File A 305 includes data referenced by logical block locations 4 and 5 of logical volume 1 120(2).

During normal system operation, the operating system or applications of client 205(1) send a data read request for data that is part or all of File A 305. Filesystem 210(1) accesses logical block locations 4 and 5 of logical volume 1 120(1), in order to satisfy the read request. Logical block locations 4 and 5 of logical volume 1 120(1) map to physical block locations P2 and P1 of deduplication storage area 115. Thus, client 205(1), retrieves the data from physical block locations P2 and P1, in that order, via filesystem 210(1).

When modifying or wiring data to server storage device 110, clients 205(1)-(2) access logical block locations within logical volume 1 120(1). Then, the data blocks are retrieved from the physical block locations within deduplication storage area 115 represented by the accessed logical block locations. The modified or new blocks of data are written to new physical block locations within deduplication storage area 115. Then, in the case of a modified data block, the logical block location's reference is rerouted to the new physical block location. If the data block is a new block of data, a logical block location is assigned to the new physical block location and the reference is updated.

Figure 4:
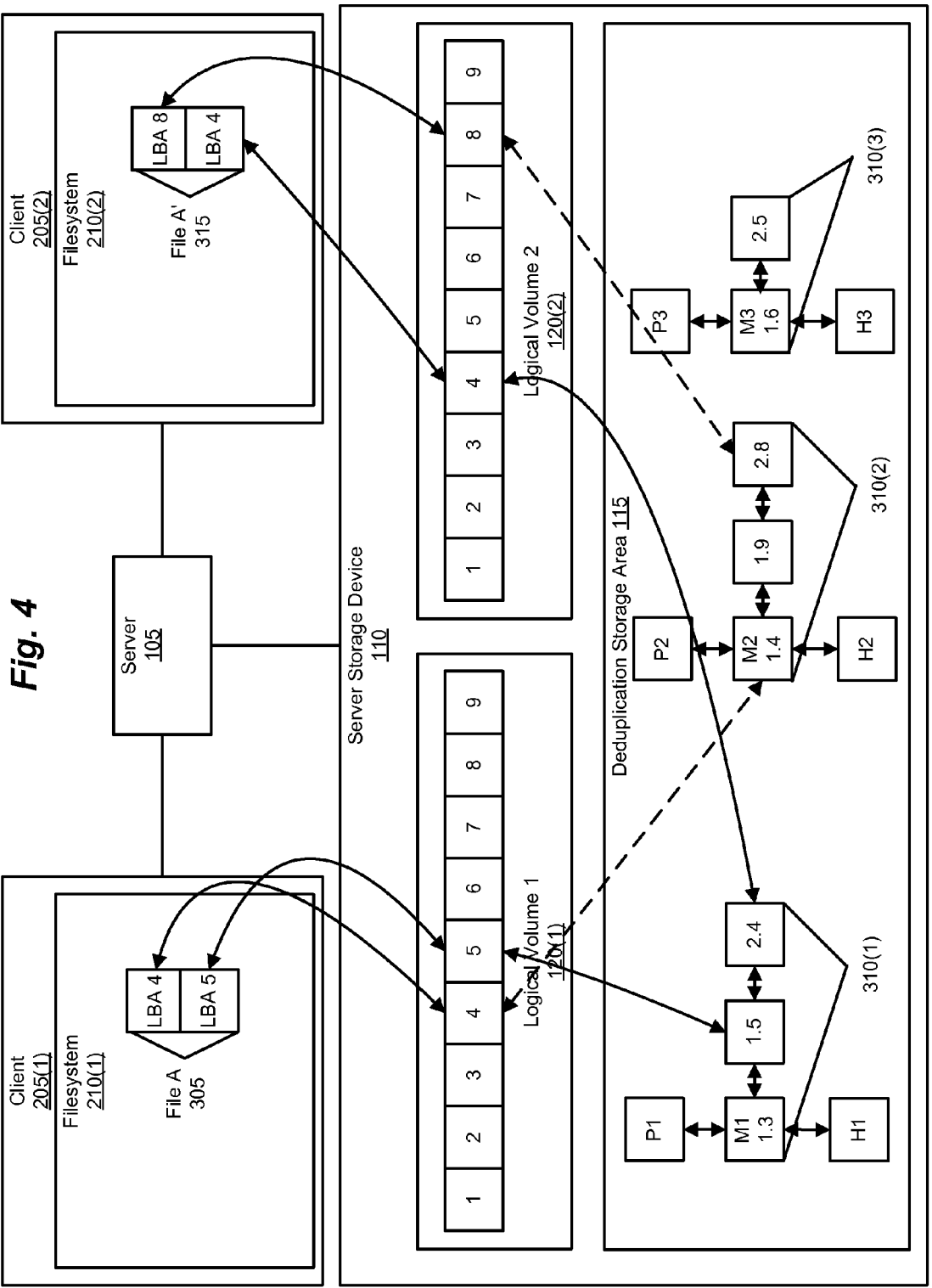
FIG. 4 is a block diagram illustrating a data deduplication system that has copied data between logical volumes using deduplication-aware copy of data, according to an embodiment.

FIG. 4 is an example illustrating the mapping relationships between logical block locations within logical volumes, and physical block locations within a data deduplication system, after a data deduplication-aware copy of a file. As illustrated, filesystem 210(1) includes File A 305, which includes logical block addresses 4 and 5. Logical block addresses 4 and 5 reference logical block locations 4 and 5 of logical volume 1 120(1). Logical block location 4 of logical volume 1 120(1) maps to physical block location P2 of deduplication storage area 115. Also, logical block location 5 of logical volume 1 120(2) maps to physical block location P1 of deduplication storage area 115.

A copy manager and a deduplication manager (e.g., copy manager 125 and deduplication manager 135, both of FIG. 1) perform a data deduplication-aware copy of File A 305. Afterwards, instead of allocating additional physical block locations, the copy manager allocates File A' 315, which is mapped by filesystem 210(2) to logical block locations within logical volume 2 120(2) (e.g., logical block locations 4 and 8 of logical volume 2 120(2). The deduplication manager modifies the physical block location metadata and deduplication chains 310(1) and 310(2) to reflect the mapping of logical block location 4 of logical volume 2 120(2) to physical block location P1, and logical block location 8 of logical volume 2 120(2) to physical block location P2. The copy manager and the deduplication manager can then perform data deduplication-aware copying of data by modifying the physical block location metadata and deduplication chains, without any transmission or modification of the data blocks within deduplication storage area 115.

Figure 5:
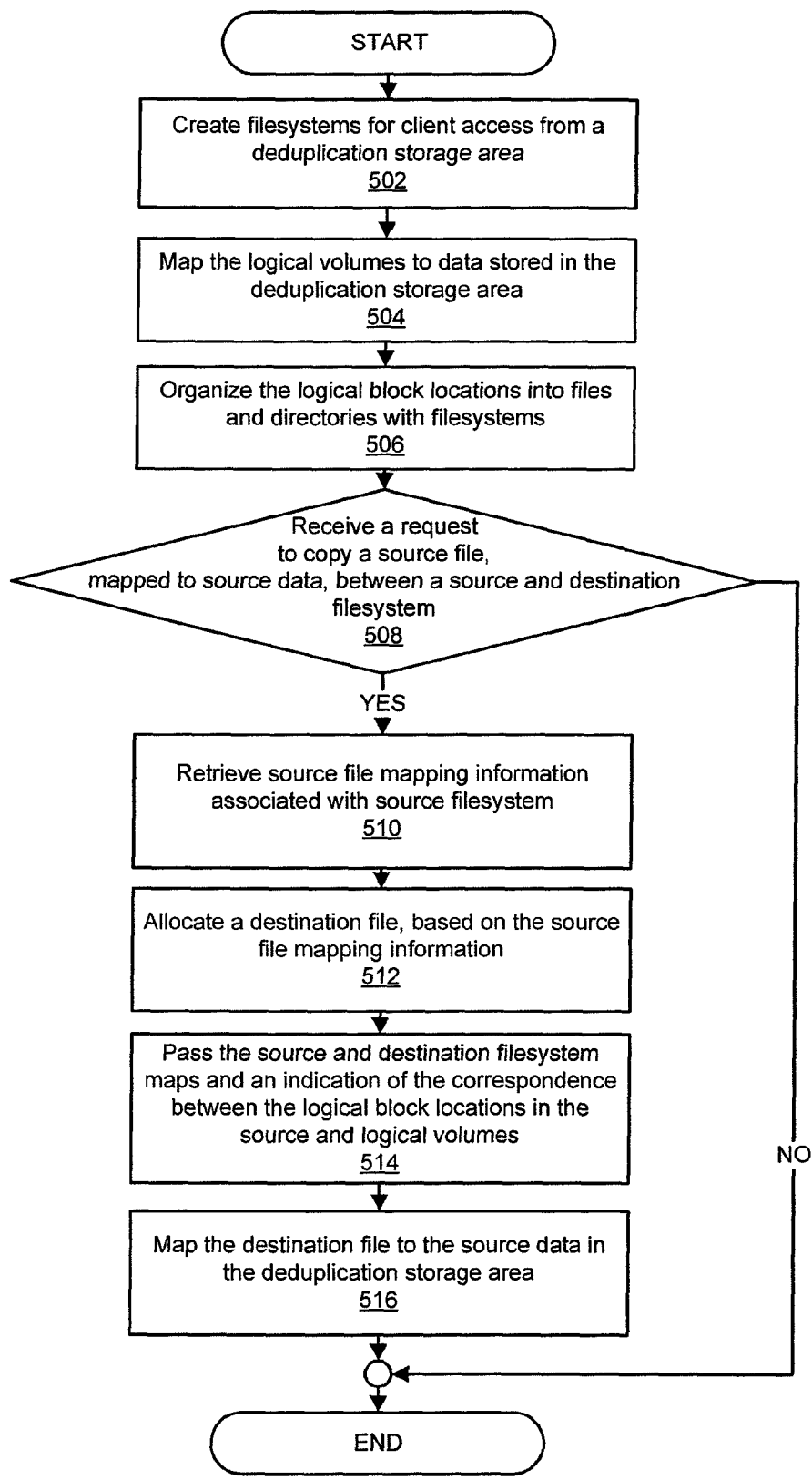
FIG. 5 is a high-level flowchart illustrating a method for implementing data deduplication-aware copying of data, according to one embodiment.

FIG. 5 is a flowchart illustrating a method for implementing data deduplication-aware copying of data, according to one embodiment. Generally, the data deduplication-aware copying of data remaps physical block location metadata within a deduplication storage area without actually transferring data blocks between a source filesystem and destination filesystem. The process of FIG. 5 begins with a system, such as server 105 of FIG. 1, client 205 of FIG. 2 or a server-client system of FIG. 6, creating logical volumes (e.g., logical volumes 120(1)-(N) of FIG. 1) of a deduplication storage area (e.g., deduplication storage area 115)(502). According to one embodiment, the logical volumes are space-optimized snapshots. Modifications to data blocks stored in the logical volumes are stored in the deduplication storage area for further processing.

The system then maps the logical volumes to data stored in the deduplication storage area (504). Clients accessing the logical volumes via the server implement filesystems (e.g., filesystem 210 of FIG. 2) to organize the logical block locations of the logical volumes into files and directories (506). A copy manager (e.g., copy manager 125 of FIG. 1) receives a request to copy a source file, which is mapped to source data in the deduplication storage area, from a source filesystem to a destination filesystem (508). The copy manager retrieves source file mapping information from a source filesystem map associated with the source filesystem (510). The source file mapping information indicates a first set of logical block locations within the source logical volume that make up the source file in the source filesystem. Using the source file mapping information, the copy manager allocates a second set of logical block locations within the destination logical volume and also allocates a destination file within the destination filesystem (512). The destination file includes the allocated second set of logical block locations within the destination logical volume. According to one embodiment of the present invention, the allocated destination file is the same size as the source file. The size of the source file is retrieved from the source file mapping information. As previously discussed, the allocation of the destination file is performed without writing any data to the destination file.

The copy manager then passes the source and destination filesystem maps and an indication to a deduplication manager, where the indication reflects the correspondence between the first set of logical block locations within the source logical volume and the second set of logical block locations within the destination logical volume (514). The deduplication manager accesses physical block location metadata corresponding to the physical block locations mapped by the first set logical block locations within the source logical volume. Then, the deduplication manager modifies the physical block location metadata to include a mapping between the physical block locations and the second set logical block locations within the destination logical volume (516). Thus, the copy manager, in conjunction with the deduplication manager, copies the source file in the source filesystem to the destination file in the destination filesystem by modifying physical block location metadata, and without modifying or transmitting any blocks of data in the common deduplication storage area.

An Example Computing Environment

Figure 6:
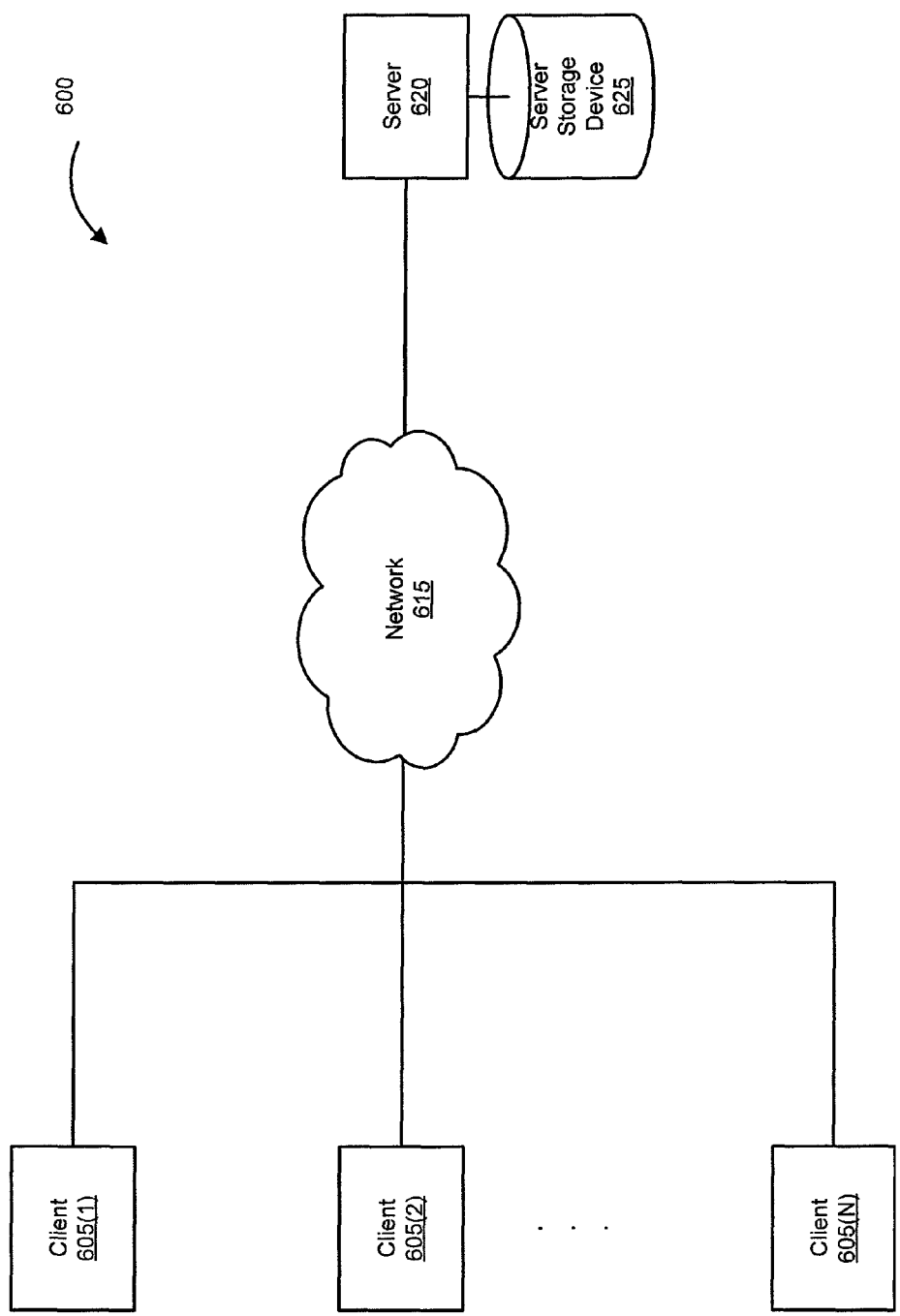
FIG. 6 is a block diagram illustrating a network architecture in which an embodiment of the present invention can be implemented.

FIG. 6 illustrates a system that implements data deduplication-aware copying of data, according to one embodiment. As shown, system 600 includes clients 605(1)-(N), which are coupled to communicate with server 620. Clients 605(1)-(N) are coupled to server 620 via a network 615, which can be implemented as a local area network (LAN), storage area network (SAN), wide area network (WAN), and the like.

Server 620 is coupled to a server storage device 625, which stores user data. Server storage device 625 can be, for example, a hard disk a compact disc (CD), a digital versatile disc (DVD), or other mass storage device, or a storage system (e.g., a redundant array of independent disks (RAID) system or an optical storage jukebox) that includes an array of such storage devices. Server storage device 625 can include logical volumes that are implemented on an underlying physical storage device (e.g., a RAID system).

When implemented as a block-level deduplication storage device, server storage device 625 maintains a block-level deduplication storage area, discussed herein in more detail in conjunction with FIG. 2B. The block-level deduplication storage area includes a group of physical block location for storing data. In conjunction with a deduplication manager, deduplication storage area stores only one copy of each block of data within the physical block locations. Clients 605(1)-(N) accesses server 620 to read, write, or otherwise modify data stored in physical block locations of server storage device 625. As previously discussed, a block of data can be of any size and is not limited to any particular unit of disk allocation.

Elements of the system can be implemented using a variety of computer systems and networks. An example of one such computing environment is described below with reference with FIG. 7.

Figure 7:
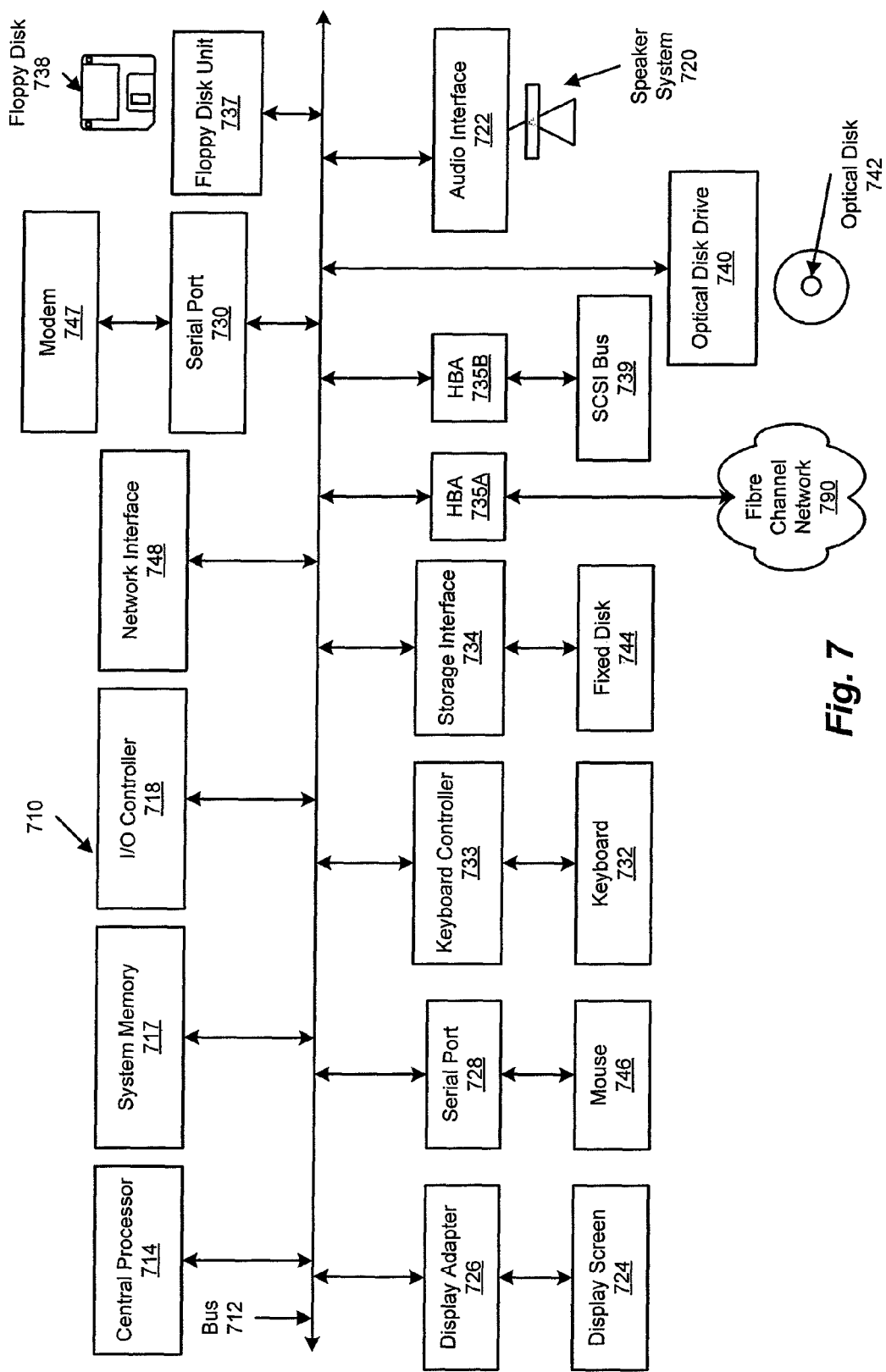
FIG. 7 is a block diagram that illustrates an example of a computer system suitable for implementing embodiments of the present invention.

FIG. 7 depicts a block diagram of a computer system 710 suitable for implementing a server (e.g., server 120 of FIG. 1) as well as the clients (e.g., clients 105(1)-(N) of FIG. 1). Computer system 710 includes a bus 712 which interconnects major subsystems of computer system 710, such as a central processor 714, a system memory 717 (typically random-access memory (RAM), but which may also include read-only memory (ROM), flash ROM, or the like), an input/output controller 718, an external audio device, such as speaker system 720 via an audio output interface 722, an external device, such as a display screen 724 via display adapter 726, serial ports 728 and 730, a keyboard 732 (interfaced with keyboard controller 733), a storage interface 734, a floppy disk drive 737 operative to receive a floppy disk 738, a host bus adapter (HBA) interface card 735A operative to connect with a Fibre Channel network 790, a host bust adapter (HBA) interface card 735B operative to connect to a SCSI bus 739, and an optical disk drive 740 operative to receive an optical disk 742. Also included are a mouse 746 (or other point-and-click device, coupled to bus 712 via serial port 728), a modem 747 (coupled to bus 712 via serial port 730), and a network interface 748 (coupled directly to bus 712).

Bus 712 allows data communication between central processor 714 and system memory 717, which may include read-only memory (ROM) or flash memory (neither shown) and random access memory (RAM) (not shown), as previously noted. RAM is generally the main memory into which operating system and application programs are loaded. ROM or flash memory can contain, among other code, the Basic Input-Output system (BIOS) which controls basic hardware operation such as the interaction with peripheral components. Applications resident with computer system 710 are generally stored on and accessed via a computer-readable medium, such as hard disk drive (e.g., fixed disk 744), an optical drive (e.g., optical drive 740), a floppy disk unit 737, or other storage medium.

Storage interface 734, as with other storage interfaces of computer system 710, can connect to a standard computer-readable medium for storage and/or retrieval of information, such as a fixed disk drive 744. Fixed disk drive 744 may be a part of computer system 710 or may be separate and accessed through other interface systems. Modem 747 may provide a direct connection to a remote server via a telephone link or to the Internet via an internet service provider (ISP). Network interface 748 may provide a direct connection to a remote server via a direct network link to the Internet via a point-of-presence (POP). Network interface 748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras, and so on). Conversely, all of the devices shown in FIG. 7 need not be present. The devices and subsystems can be interconnected in different ways from that shown in FIG. 7. The operation of the computer system such as that shown in FIG. 7 is readily known in the art and is not discussed in detail in this application. Code to implement the previously-described features can be stored in computer-readable storage media such as one or more of system memory 717, fixed disk 744, optical disk 742, or floppy disk 738. The operating system provided on computer system 710 may be MS-DOS®, MS-WINDOWS®, OS/2®, UNIX®, Linux®, or other known operating system.

As an example implementation of computer system 710, server 105 of FIG. 1 can store copy manager 125, server-to-client module 130, deduplication manager 135, and server storage device driver 140 in computer-readable storage media (e.g., memory 717 and the like). Regarding client 205, filesystem 210, filesystem map 215, and client-to-server module 220 can be stored in computer-readable storage media (e.g., memory 717 and the like) and executed by central processor 714 to perform the features described herein. Also, network interface 748 may be used by any of the modules described in server 105 to communicate with client 205 or vice versa. For example, copy manager 125 can access filesystem map 215 via server-to-client module 130, which can be implemented in computer-readable storage media or by network interface 748.

Moreover, regarding the messages and/or data signals described herein, those skilled in the art will recognize that a signal may be directly transmitted from a first block to a second block, or a signal may be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signals is transmitted between the blocks. To some extent, a signal input at a second block may be conceptualized as a second signal derived from a first signal output from a first block due to the physical limitations of the circuitry involved (e.g., there will inevitably be some attenuation and delay). Therefore, as used herein, a second signal derived from the first signal includes the first signal or any modifications to the first signal, whether due to circuit limitations or due to passage through other circuit elements which do not change the informational and/or final functional aspect of the first signal.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   in response to a request to copy a source file from a source filesystem to a destination filesystem, retrieving file mapping information corresponding to the source file, wherein
      the file mapping information is stored in a source filesystem map,
      the source filesystem accesses a source logical volume, the source logical volume maps to a deduplication storage area,
      the destination filesystem accesses a destination logical volume, wherein
         the destination logical volume maps to the deduplication storage area, and
      the source file comprises one or more data blocks stored in a first plurality of physical block locations in the deduplication storage area;
   allocating a destination file in the destination filesystem, based on the file mapping information, wherein
      the allocating comprises allocating a second plurality of logical block locations in the destination logical volume; and
   mapping the destination file to the one or more data blocks, wherein
      the destination file comprises the one or more data blocks,
      the mapping the destination file is performed without copying the one or more data blocks to the destination file, and
      the mapping the destination file comprises modifying metadata associated with the first plurality of physical block locations.

2. The method of claim 1, wherein
   the file mapping information further comprises a size of the source file.

3. The method of claim 1, wherein the allocating further comprises:
   correlating the destination file to the second plurality of logical block locations in the destination logical volume.

4. The method of claim 1, wherein the retrieving file mapping information further comprises:
   accessing the source filesystem map, wherein
      the source filesystem map comprises the metadata, and
      the metadata describes the location of files and directories within the source logical volume.

5. The method of claim 1, further comprising:
   sending an indication of correspondence of the first plurality of logical block locations in the source logical volume to the second plurality of logical block locations in the destination logical volume.

6. The method of claim 1, wherein
   the source logical volume and the destination logical volume are different views of data stored in the deduplication storage area.

7. The method of claim 1, wherein
the source logical volume and the destination logical volume are virtual machines.

8. A system comprising:
one or more processors; and
memory, comprising instructions for execution on the one or more processors, the instructions for
retrieving file mapping information corresponding to the source file, in response to a request to copy a source file from a source filesystem to a destination filesystem, wherein
the file mapping information is stored in a source filesystem map,
the source filesystem accesses a source logical volume,
the source logical volume maps to a deduplication storage area,
the destination filesystem accesses a destination logical volume, wherein
the destination logical volume maps to the deduplication storage area, and
the source file comprises one or more data blocks stored in a first plurality of physical block locations in the deduplication storage area,
allocating a destination file in the destination filesystem, based on the file mapping information, wherein
the allocating comprises allocating a second plurality of logical block locations in the destination logical volume, and
mapping the destination file to the one or more data blocks, wherein
the destination file comprises the one or more data blocks,
the mapping the destination file is performed without copying the one or more data blocks to the destination file, and
the mapping the destination file comprises modifying metadata associated with the first plurality of physical block locations.

9. The system of claim 8, wherein
the file mapping information further comprises a size of the source file.

10. The system of claim 8, wherein the instructions for allocating further comprise instructions for:
correlating the destination file to the second plurality of logical block locations in the destination logical volume.

11. The system of claim 8, wherein the instructions for retrieving the file mapping information corresponding to the source file further comprise instructions for:
accessing the source filesystem map, wherein
the source filesystem map comprises the metadata, and
the metadata describes the location of files and directories within the source logical volume.

12. The system of claim 8, wherein the memory further comprises instructions for:
sending an indication of correspondence of the first plurality of logical block locations in the source logical volume to the second plurality of logical block locations in the destination logical volume.

13. A non-transitory computer-readable storage medium comprising computer-readable program code, when executed by a processor, execute instructions for:
retrieving file mapping information corresponding to a source file, in response to a request to copy the source file from a source filesystem to a destination filesystem, wherein
the file mapping information is stored in a source filesystem map,
the source filesystem accesses a source logical volume,
the source logical volume maps to a deduplication storage area,
the destination filesystem accesses a destination logical volume,
the destination logical volume maps to the deduplication storage area, and
the source file comprises one or more data blocks stored in a first plurality of physical block locations in the deduplication storage area;
allocating a destination file in the destination filesystem, based on the file mapping information, wherein
the allocating comprises allocating a second plurality of logical block locations in the destination logical volume; and
mapping the destination file to the one or more data blocks, wherein
the destination file comprises the one or more data blocks,
the mapping the destination file is performed without copying the one or more data blocks to the destination file, and
the mapping the destination file comprises modifying metadata associated with the first plurality of physical block locations.

14. The non-transitory computer-readable storage medium of claim 13, wherein
the file mapping information further comprises a size of the source file.

15. The non-transitory computer-readable storage medium of claim 13, wherein the instructions for allocating comprise instructions for:
correlating the destination file to the second plurality of logical block locations in the destination logical volume.

16. The non-transitory computer-readable storage medium of claim 13, wherein the instructions for retrieving the file mapping information further comprise instructions for:
accessing the source filesystem map, wherein
the source filesystem map comprises metadata, and
the metadata describes the location of files and directories within the source logical volume.

17. The non-transitory computer-readable storage medium of claim 13, further comprising instructions for:
sending an indication of correspondence of the first plurality of logical block locations in the source logical volume to the second plurality of logical block locations in the destination logical volume.

* * * * *